United States Patent
Sogaard (10) Patent No.: US 7,106,657 B2
(45) Date of Patent: Sep. 12, 2006

(54) DIGITAL SOUNDER MODULE AND METHOD FOR DETECTING

(75) Inventor: Sten Sogaard, Boynton Beach, FL (US)

(73) Assignee: Raymarine, Incorporated, Merrimack, NH (US)

( * ) Notice: Subject to any disclaimer, the term of this patent is extended or adjusted under 35 U.S.C. 154(b) by 0 days.

(21) Appl. No.: 11/229,634

(22) Filed: Sep. 20, 2005

(65) Prior Publication Data
US 2006/0013067 A1    Jan. 19, 2006

Related U.S. Application Data

(63) Continuation of application No. 10/704,606, filed on Nov. 12, 2003, now Pat. No. 6,950,372.

(60) Provisional application No. 60/430,939, filed on Dec. 5, 2002.

(51) Int. Cl.
*G01S 15/96* (2006.01)
*G01S 15/00* (2006.01)

(52) U.S. Cl. .......................... 367/99; 367/107; 367/900

(58) Field of Classification Search .............. 367/87, 367/97, 98, 99, 107, 900
See application file for complete search history.

(56) References Cited

U.S. PATENT DOCUMENTS

| 4,000,650 | A | | 1/1977 | Snyder ...................... 73/290 |
| 5,724,433 | A | * | 3/1998 | Engebretson et al. ........ 381/106 |
| 6,418,080 | B1 | | 7/2002 | Inouchi ....................... 367/87 |
| 6,445,646 | B1 | | 9/2002 | Handa et al. ............... 367/105 |

FOREIGN PATENT DOCUMENTS

NZ    505896    5/2003

\* cited by examiner

*Primary Examiner*—Ian J. Lobo
(74) *Attorney, Agent, or Firm*—Levy & Grandinetti (57) ABSTRACT

The invention is a digital sounder module and its method for detection. The digital sounder module includes a sonar carrier wave producing means, a band-pass filter, a pre-amplifier for providing a high sensitivity and extending a wide dynamic range, and an analog-to-digital converter for providing a digital implementation of a superheterodyne detector and producing an intermediate frequency. The digital sounder module also includes a programmable logic device for controlling a gain of the pre-amplifier and for digitally filtering the intermediate frequency and a microprocessor. The method implemented by the controlled per-amplifier gain processes the return echo signal by controlled ramp up of the gain over time to compensate for the change in signal strength in proportion to the length of the return path.

6 Claims, 7 Drawing Sheets

DIGITAL SOUNDER MODULE AND METHOD FOR DETECTING

This application is a continuation of U.S. application Ser. No. 10/704,606 filed on Nov. 12, 2003 now U.S. Pat. No. 6,950,372, which claimed the benefit under Title 35, U. S. C., §120, to U.S. Provisional Application No. 60/430,939, filed on Dec. 5, 2002, by Mr. Sten Sogaard for DIGITAL SOUNDER MODULE AND METHOD FOR DETECTING.

BACKGROUND OF THE INVENTION

1. Field of the Invention

This invention relates to a sonar system and a method for detecting with the sonar system. Specifically, the invention relates to a sonar system and a method for detecting for use as a recreational fish finder.

2. Description of the Related Art

A sonar system typically consists of a transmitter, a transducer, a receiver, and a display. The transmitter of the sonar system transmits an electrical impulse. The transducer converts the electrical impulse into a sound wave and sends the sound wave through the water. When the sound wave strikes an object, the sound wave rebounds and returns to the sonar system. The sonar return wave strikes the transducer of the sonar system and the transducer converts the sonar return wave into an electrical signal. The receiver filters, amplifies, and detects the sonar return signal. The receiver converts the sonar return signal into a digital signal after its detection and sends the amplified signal to the display.

The receiver section of a conventional sonar system comprises an analog filter and an analog detector. Such conventional sonar receiver sections can be built using a Philips SA604 "High Performance low power FM IF system." The Philips SA604 is a monolithic low-power FM intermediate frequency (IF) system that incorporates two limiting IF amplifiers, a quadrature detector, muting, a logarithmic received signal strength indicator, and a voltage regulator. The Philips SA604 is typically used in radios for use as an IF amplifier. The Philips SA604 includes a Received Signal Strength Indicator (RSSI) for outputting a logarithmic representation of the signal strength on the IF input.

A disadvantage of conventional sonar systems is that they are manually tuned during the production and do allow for a later adjustment of the center frequency. As a result, tuning cannot be optimized for use with a specific transducer.

An additional disadvantage of conventional sonar systems is that the bandwidth is fixed. A fixed bandwidth makes it impossible for the sonar system to retrieve an optimal time/frequency response in both shallow and deep water, thus affecting the resolution.

Conventional sonar systems have a dynamic range of approximately 120 dB. An analog-to-digital (A/D) converter with a minimum resolution of 20 bits is required to sample sonar return waves digitally within this dynamic range. The expense of a commercially available A/D converter with 20 bits of resolution is too high for practical use in a recreational fishfinder.

It is an object of the invention to provide a sonar system that performs a digital filtration and a digital detection of a sonar carrier wave.

An additional object of the invention is to provide a sonar system with a high sensitivity and a wide dynamic range.

An additional object of the invention is to provide a sonar system with a programmable frequency.

Another object of the invention is to provide a sonar system with an automatic tuning that can be optimized for use with a specific transducer.

Another object of the invention is to provide a sonar system with a programmable bandwidth.

Another object of the invention is to provide a sonar system with an optimal time/frequency response in both shallow and deep water.

Another object of the invention is to provide a sonar receiver section with commercially available components that are of low cost and are suitable for use in a recreational fishfinder.

SUMMARY OF THE INVENTION

The problems and disadvantages of the conventional sonar systems discussed above are overcome, and other advantages are provided, by the following invention. The invention includes a sonar system with a high sensitivity, a wide dynamic range, a programmable frequency, and a programmable bandwidth. The invention also includes a method for performing a digital filtration and a digital detection of a sonar return wave.

The invention is a digital sounder module. The digital sounder module includes a sonar carrier wave producing means, a band-pass filter, a pre-amplifier for providing a high sensitivity and extending a wide dynamic range, and an analog-to-digital converter for providing a digital implementation of a superheterodyne detector and producing an intermediate frequency. The digital sounder module also includes a programmable logic device for controlling a gain of the pre-amplifier and for digitally filtering the intermediate frequency and a microprocessor.

The invention also relates to a method for performing a digital filtration and a digital detection of a sonar return wave. This method for detecting a sonar carrier wave includes receiving a sonar carrier wave, limiting the sonar carrier wave with a band-pass filter, and amplifying the filtered sonar carrier wave with a pre-amplifier. Then the method includes feeding the amplified sonar carrier wave to an analog-to-digital converter to produce an intermediate frequency of the sonar carrier wave. Next, controlling the pre-amplifier and the analog-to-digital converter a programmable logic device is performed. This step is followed by filtering digitally the sonar carrier wave and detecting digitally the sonar carrier wave.

DETAILED DESCRIPTION OF THE INVENTION

The invention includes a sonar system with a high sensitivity, a wide dynamic range, a programmable frequency, and a programmable bandwidth. The invention also includes a method for performing a digital filtration and a digital detection of a sonar return wave.

Figure 1:
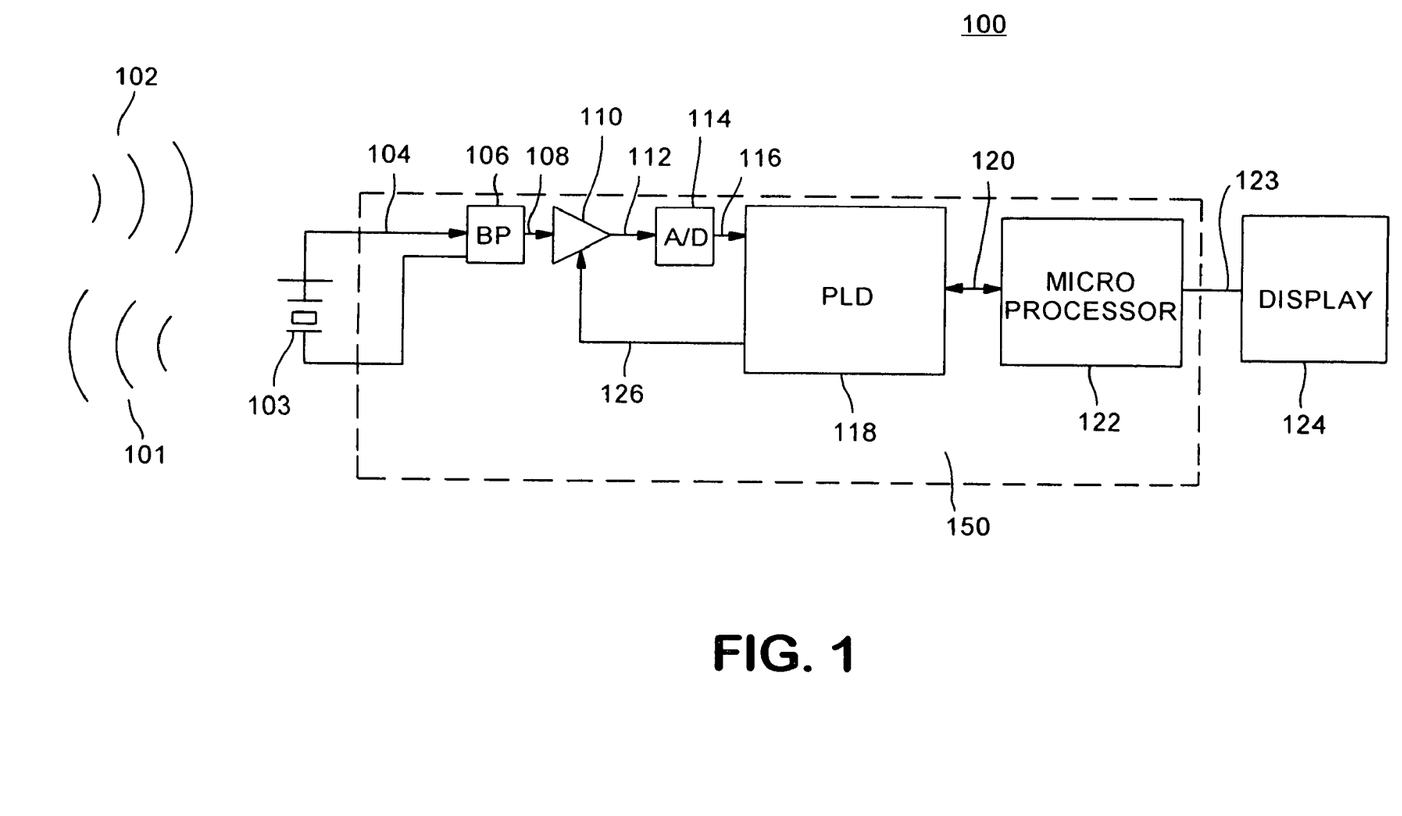
FIG. 1 illustrates a sonar system in accordance with the invention.

FIG. 1 illustrates a sonar system 100 in accordance with the invention. The sonar system 100 includes a sonar sound wave 101, a sonar return wave 102, a transducer 103, a sonar return signal 104, a digital sounder module (DSM) 150, and a display 124. The DSM 150 includes a band-pass filter 106, a filtered return signal 108, a pre-amplifier 110, an amplified return signal 112, an analog-to-digital (A/D) converter 114, an intermediate frequency (IF) return signal 116, a programmable logic device (PLD) 118, a digitized return signal 120, a microprocessor 122, a compressed signal 123, and a pre-amplifier gain curve 126, illustrated in FIG. 8C.

Figure 7:
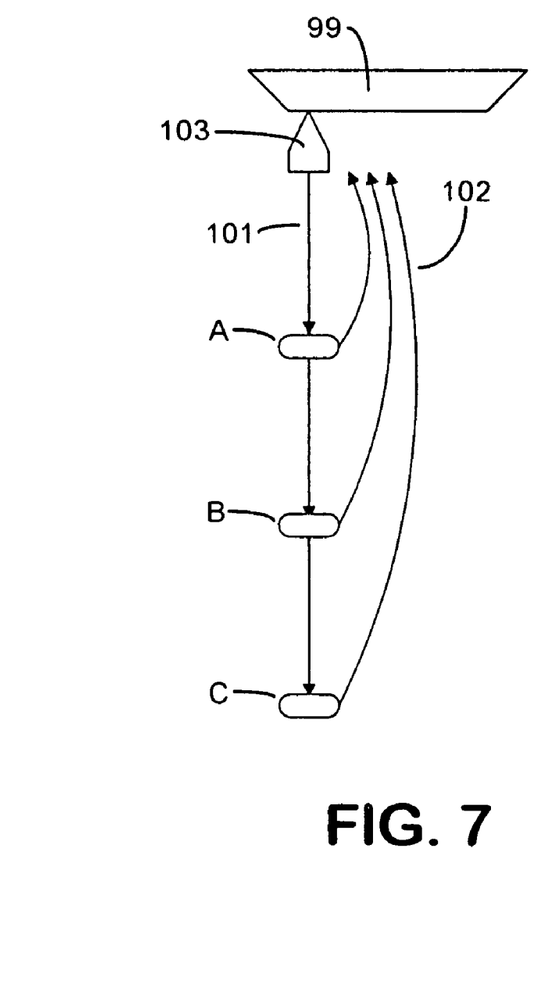
FIG. 7 illustrates a transducer mounted on the hull of a vessel with echo reflections from three targets at varied depth.

As illustrated in FIG. 7, the transducer 103 of the sonar system 100 mountedto the vessel 99, transmits a sonar sound wave 101 out into the water. When the sonar sound wave 101 strikes an object, such as exemplary objects A, B and C, the sonar sound wave 101 rebounds and returns to the transducer 103 of the sonar system 100. The sonar return waves 102 strike the transducer 103 of the sonar system 100.

The transducer 103 can be either a thru-hull, an in-hull, or a transom mount transducer. The transducer 103 emits a sonar acoustic wave 101 at either 200 kHz or 50 kHz in the exemplary embodiments, however any sonar wave can perform in acordance with the teachings of the present invention. The transducer 103 receives the sonar return wave 102, as a series of reflections of sonar wave 101 from objects in the water and from the bottom of the body of water if within range of the sonar detection capabilities. By measuring the return time of the echo, the distance traveled can be determined. The received echo is converted into an electrical sonar return signal 104. The transducer 103 then sends the sonar return signal 104 to the DSM 150. The general characteristics of a typical sonar echo return signal 104 with three echos are illustrated in extremely simplified form in FIG. 8A.

The PLD controls the systems and adjusts such parameters as anticipated ping depth dependent upon return echo characteristics or user selected sonar parameters. In order to pass the initial unmodified signal with least clipping, first band pass filter 106 is set to the widest bandpass. The programable band pass filter which adjusts according to depth of application, is in the PLD. A narrow band pass filter is selected by the PLD to give good performance in deep water a wider bandpass is selected for shallow water. The transducer 103 pings are sent once every two seconds to twenty six times per second, less often in deeper water (once every two seconds) to allow for echo return time and more often (up to twenty six times per second) in shallow water. The PLD matches a narrow bandpass with less frequent pulses and a wider bandpass with a more frequent pulse rate.

Figure 8A:
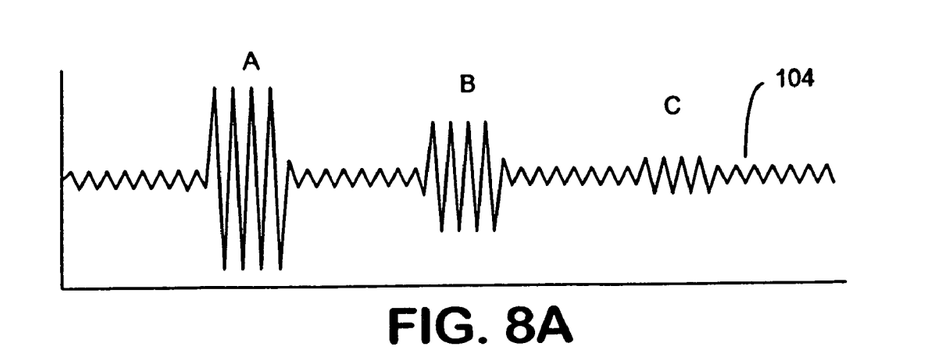
FIG. 8A through 8D illustrates the modification of the echo return signal by the signal processing of the present invention.

The signal 104, FIG. 8A, has a carrier frequency of 50 of 200 kHz depending upon the frequency of the transducer 103. Regions of increased magnitude in the wave form (A, B and C) indicate echos of the signal reflected by objects in the water. Three echos are indicated for simplified illustrative purposes. A return sonar may have more or fewer echos. The position along the wave is indicative of the depth of the object. Echo A is a reflection from an object closer to the surface than object B, which in turn is closer than object C. The magnitude m and duration l of the region of increased magnitude is indicative of the size of the object causing the reflected echo. However, because of the characteristics of acoustic sonar echo reflection, the echo reflections of similarly sizes objects can vary significantly in magnitude depending upon the distance to the object.

The DSM 150 is the receiver of the sonar system 100. A preferred embodiment of the DSM 150 is a digital implementation of a superheterodyne detector with a programmable frequency and a programmable bandwidth. The DSM 150 provides a programmable frequency range of 10 kHz to 200 KHz. The DSM 150 receives the sonar return signal 104 from the transducer 103 and the sonar return signal 104 is input to the band-pass filter 106 where it is band-pass limited.

Figures 8B, 8C:
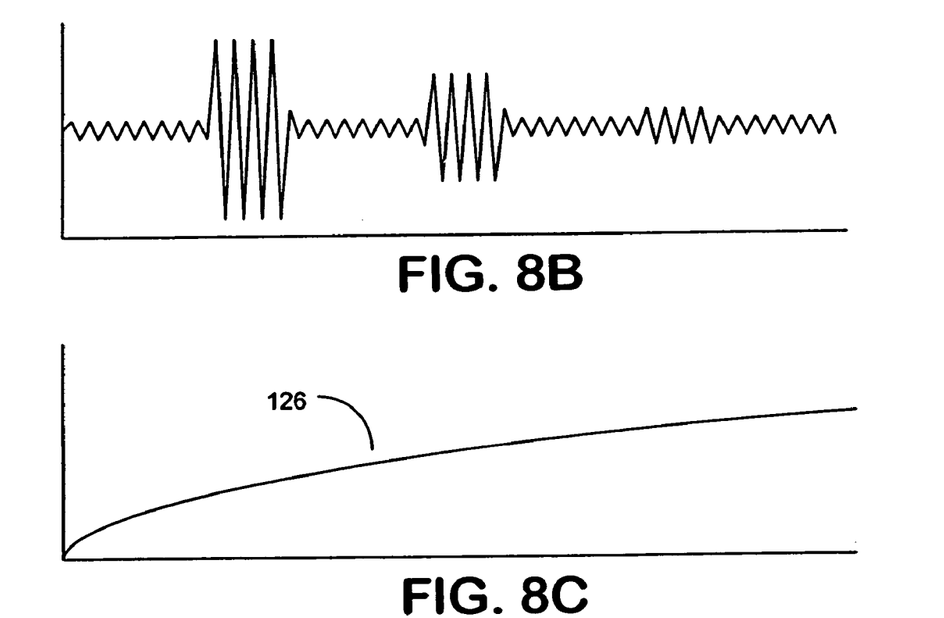

The band-pass filter 106 is a typical wide-banded band-pass filter. The band-pass filter 106 is centered around 50 kHz or 200 kHz (depending upon the frequency of the signal from the transducer 1 as determined by the PLD 118, based upon water conditions such as depth) in an preferred embodiment. The selection of frequency is controlled by the PLD 118, based upon various factors, as described below. This can easily be modified to filter any frequency between 10 kHz and 200 kHz. The band-pass filter 106 supplies a filtered signal, 8B to pre-amplifier 110. The band-pass filter 106 sends the filtered return signal 108 to the pre-amplifier 110 for modification by the pre-amp according to a variable gain.

The pre-amplifier 110 is a two-stage differential variable gain amplifier using general purpose operational amplifiers. The gain of the amplifier is set by the gain curve 126. The pre-amplifier 110 provides the DSM 150 with a high sensitivity and a wide dynamic range. The high sensitivity and the wide dynamic range of the pre-amplifier 110 allow for the use of a low cost A/D converter with a lower resolution while still maintaining the required dynamic range of the DSM 150. The pre-amplifier 110 is digitally controlled by the PLD 118. The pre-amplifier 110 amplifies the filtered return signal 108 based upon the pre-amplifier gain curve 126 that is sent by the PLD 118.

Figure 8D:
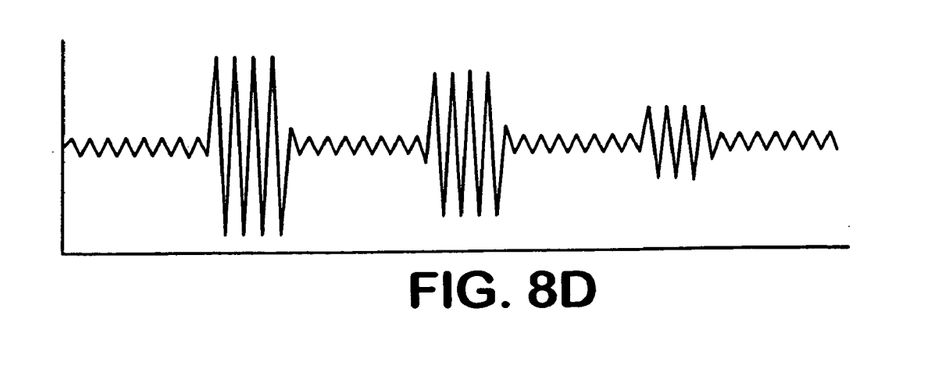

The gain curve 126, FIG. 8C, begins at a minimum gain level and increases the gain provided to amplifier 110 over time. In this manner, echos from greater depths receive significantly greater gain than echos from shallow depths. The shape of the gain curve, an important feature of the present invention, is adopted to reduce the significant difference in magnitude between signals from shallow and deep echos. Because sonar is significantly attenuated in water, the deeper the echo reflection source the greater the attenuation. By providing a gain which increases with time, the difference in echo magnitude can be partially compensated. The magnitude difference illustrated in FIG. 8A has been partially compensated as illustrated in FIG. 8D. The pre-amplifier 110 outputs the compensated return signal 112, FIG. 8D, to the A/D converter 114.

The pre-amplifier gain curve 126 increases with depth and allows for a continuous reprogramming of a programmable filter, which provides an optimal performance at any depth/pulse width. The pre-amplifier gain curve 126 provides a sensitivity time control function that reduces surface clutter and background noise by decreasing the gain in shallow water.

The A/D converter 114 is an analog-to-digital converter. A preferred embodiment of the A/D converter 114 is an LTC®1861 by Linear Technology Corporation. The LTC®1861 is a 12 bit A/D converter that offers a software-selectable two-channel multiplexer. The amplified carrier wave is converted to digital by an A/D converter. The rate at which the carrier wave is converted to digital acts as a harmonic sub-sampling and the carrier wave is transformed into an IF frequency when digitized. The AID converter 114 converts the amplified return signal 112 into an IF sonar return signal 116. The A/D converter 114 outputs and sends the IF sonar return signal 116 to the PLD 118.

The PLD 118 is a programmable logic device and operates as a co-processor for the main processor 122. A preferred embodiment of the PLD 118 is an XILNX® Spartan IIe XC2S300E. The PLD 118 uses a simplified implementation of a noncoherent windowed in-phase/quadrature (IQ) detector to filter the IF sonar return signal 116 digitally. The method for digitally filtering the IF sonar return signal 116 is illustrated in FIGS. 2 through 5 and discussed in further detail below. The PLD 118 outputs the pre-amplifier gain curve 126 to control the pre-amplifier 110 and outputs a digitized signal 120 to the microprocessor 122.

Figure 6:
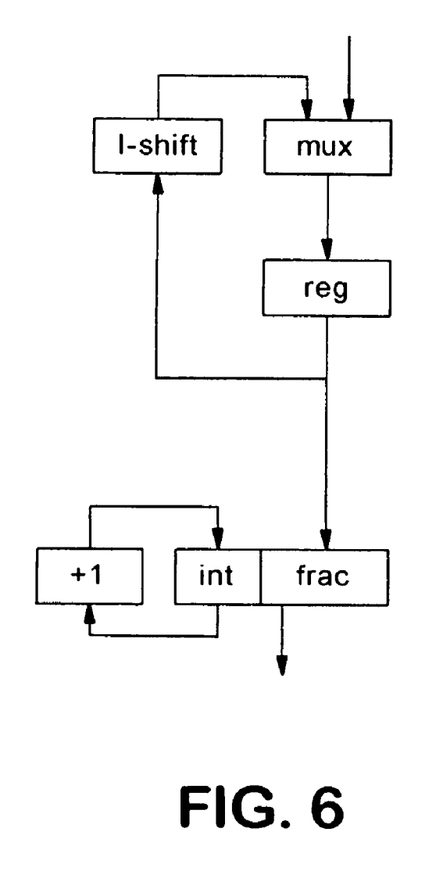
FIG. 6 illustrates the logarithmic function implemented as a piecewise linear $\log_2(\ )$ function.

The microprocessor 122 is illustrated in FIG. 6 and discussed in further detail below.

The display 124 receives the compressed signal 123 from the microprocessor 122 and outputs a display that may contain the water depth, temperature, and/or speed, as measured by the transducer 103, and a dual or a split frequency fishfinder display, as detected by the DSM 150.

Figure 2:
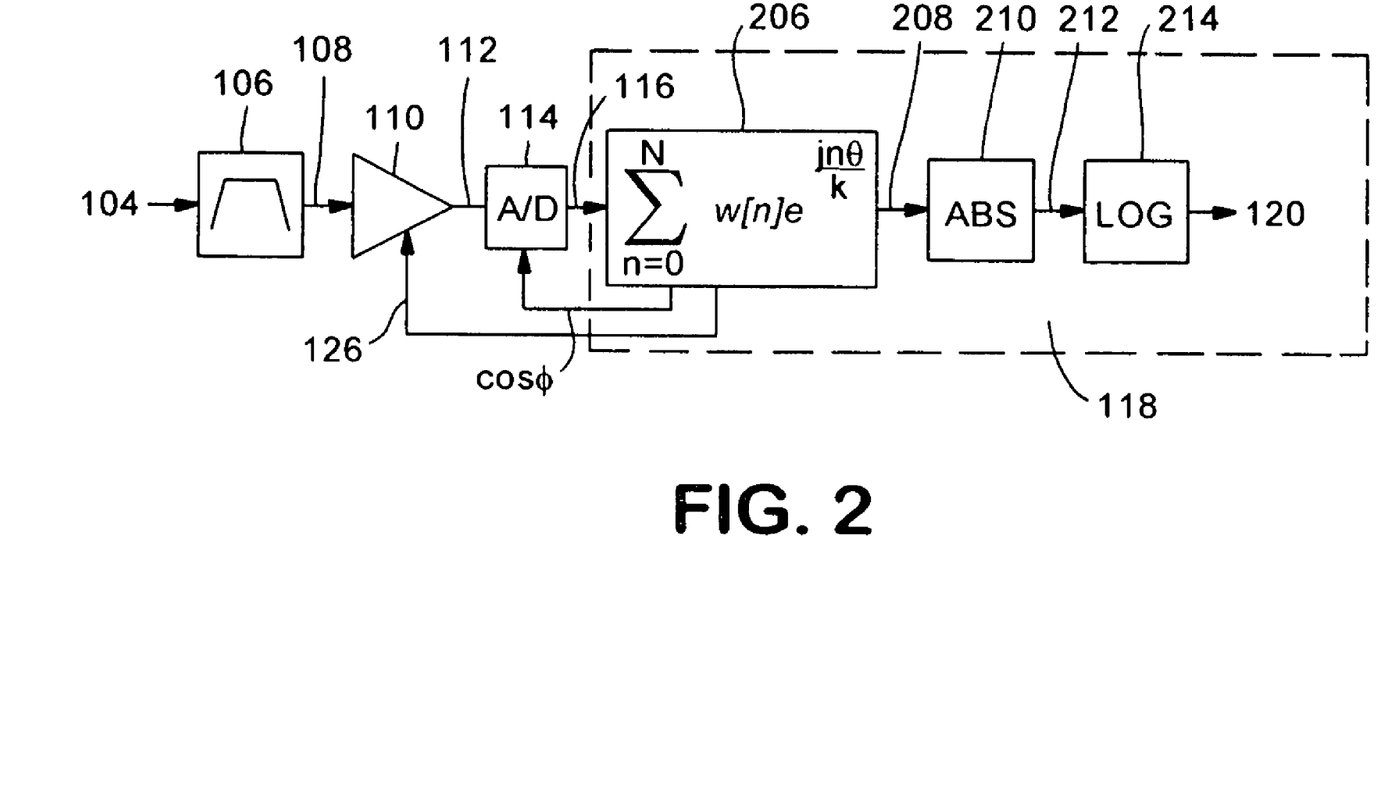
FIG. 2 illustrates a functional diagram of a digital sounder module in accordance with the invention.

FIG. 2 illustrates a functional diagram of a DSM 150 in accordance with the invention. The functional diagram of the DSM 150 includes the sonar return signal 104, the band-pass filter 106, the filtered return signal 108, the pre-amplifier 110, the amplified signal 112, an A/D converter 114, the IF sonar return signal 116, the PLD 118, and the digitized return signal 120. The PLD 118 includes a window filter 206, a windowed return signal 208, a power measurement function 210, a power signal 212, a signal compression function 214, the pre-amplifier gain curve 126.

The digital signal in an exemplary embodiment, is filtered using a single point Fourier transformation and a programmable Kaiser window. The magnitude signal is converted to a logarithmic representation.

The sonar return signal 104 is band-pass limited by the band-pass filter 106. The filtered return signal 108 is amplified by the pre-amplifier 110 based upon the pre-amplifier gain curve 126 as sent from the PLD 118. The amplified return signal 112 is input into the A/D converter 114, where it is mixed with a cosφ signal sent from the PLD 118 and converted into the IF sonar return signal 116. The PLD 118 sets the sampling rate to insure that the sonar return signal is above the Nyquist frequency. The effect of this sub-sampling is a frequency shift which is mathematically described as "mixing with a cosφ signal."

The PLD 118 detects the IF sonar return signal 116 by use of a simplified implementation of a noncoherent windowed in-phase/quadrature (I/Q) detector. The PLD 118 performs a Fourier transform of the IF sonar return signal 116. The Fourier transform converts the IF sonar return signal 116 into a complex return signal which includes a real value that is an in-phase detected signal and an imaginary value that is a quadrature detected signal. The PLD 118 then multiplies the complex return signal by the window filter 206.

The window filter 206 sets the bandwidth and the frequency roll-off. A preferred embodiment of the window filter 206 is a Kaiser window.

The power measurement function 210 measures the sonar return signal 104 by taking the absolute value of the windowed return signal 208 at a set frequency point.

The signal compression function 214 compresses the dynamic range of the DSM 150 by taking the $\log_2$ of the power signal 212 and outputs the digitized return signal 120.

The center frequency of the DSM 150 can be altered by adjusting the k value of the window filter 206.

The time/frequency response of the DSM 150 can be altered by adjusting the window function w[n] of the window filter 206.

Figure 3A:
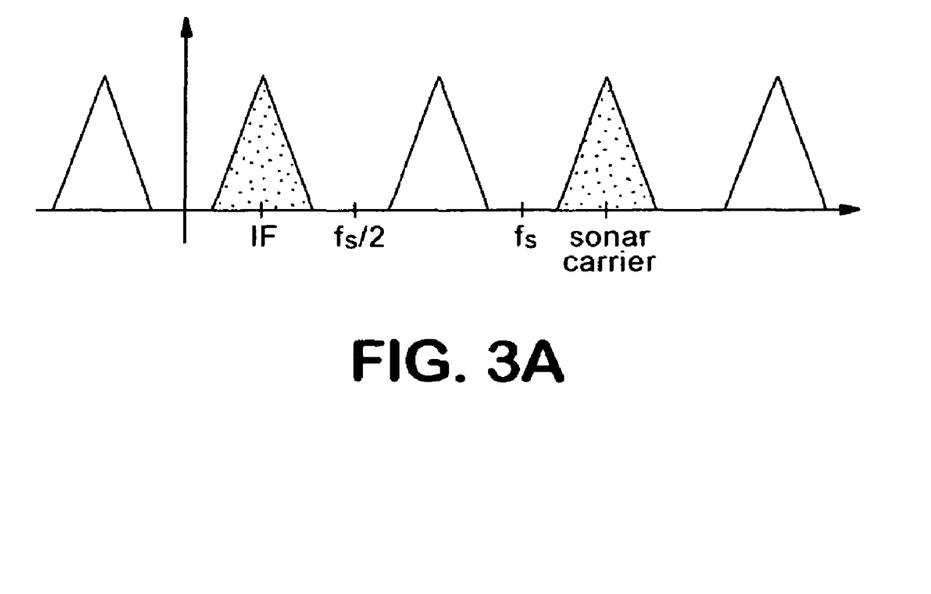
FIG. 3 illustrates a harmonic sampling of the sonar return signal.
Figure 3B:
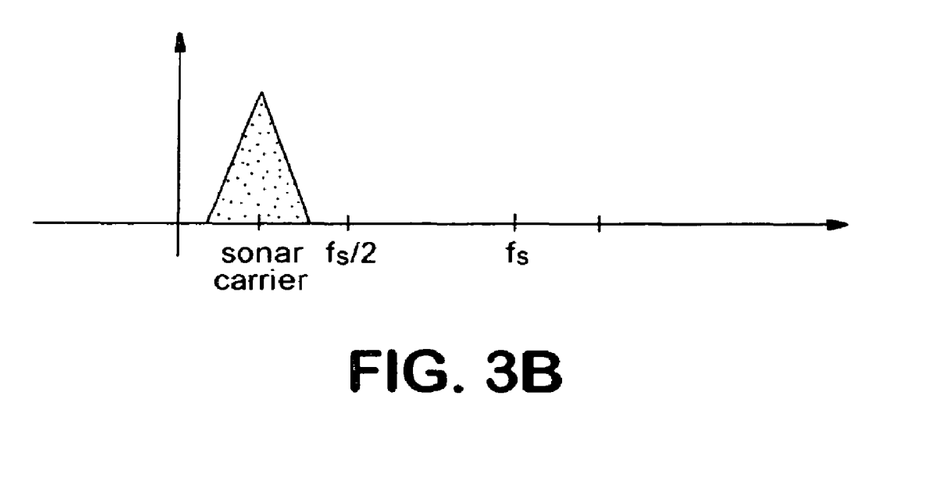

FIGS. 3A and 3B illustrates a harmonic sampling of the sonar return signal. The DSM 150 samples the sonar carrier wave through the use of harmonic sampling. The DSM 150 "undersamples" sonar carrier waves containing frequencies above the Nyquist sampling rate (one-half the sampling frequency, $f_s$) as shown in FIG. 3A. Such undersampling of the sonar return signal is possible because the sonar carrier wave is a baseband signal. Sonar carrier waves containing frequencies below the Nyquist rate are directly sampled, as shown in FIG. 3B. The A/D converter 114 samples the amplified return signal 112 and converts the amplified return signal 112 to an IF sonar return signal 116.

Figure 4:
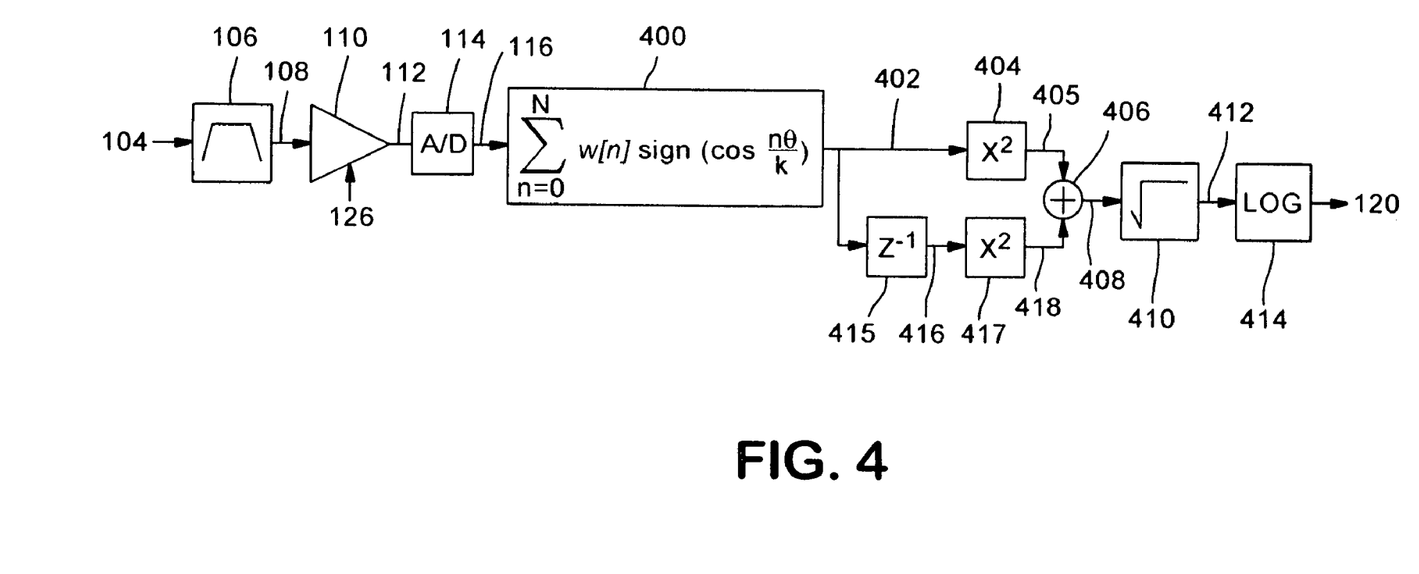
FIG. 4 illustrates an algorithm for approximating a phase shift.

FIG. 4 illustrates an algorithm for approximating a phase shift. It is not necessary to calculate both the in-phase and the quadrature component of the IF sonar return signal 116. An approximation can instead be performed by approximating either component as a 90 degree phase shift of the other. Such an approximation reduces the complexity of the calculations by half with only a few resulting minor errors. The PLD 118 approximates this phase shift by taking a Fourier transform 400 of the $\Sigma w[n]e^{(jn\Theta)/k}$ signal from the window filter 206 (shown in FIG. 2), where sign(x) equals 1 if x>0, 0 if x=0, and −1 if x<0. The square of an in-phase detected signal 402 is taken by a square function 404. A delay element 415 produces a pseudo Quadrature signal 416 of the in-phase detected signal 402. The square of the pseudo Quadrature signal 416 is then taken by a square function 417. The Euclidian distance 412 is calculated by taking the square root 410 of the sum 406 of the squared in-phase signal 405 and the squared Quadrature signal 418. The digitized sonar return signal 120 is then compressed and output by the $\log_2$ function 414.

Figure 5:
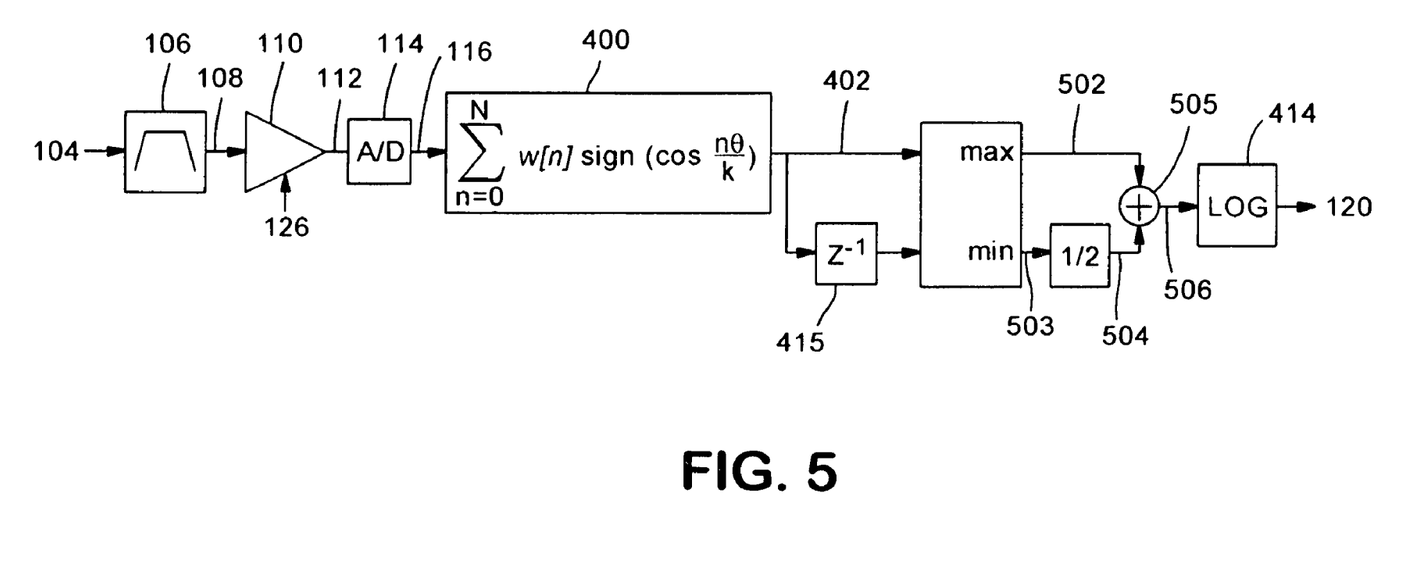
FIG. 5 illustrates an algorithm for approximating the Euclidean distance between the 90 degree out-of-phase vectors.

FIG. 5 illustrates an algorithm for approximating the Euclidian distance between 90 degree out-of-phase vectors. This approximation also provides a significant decrease in complexity without any significant sampling loss of the sonar return signal.

The filtered digital signal is compared with the previous result, and an approximated magnitude is calculated where the magnitude=max(y[n],y[n−1])+0.5*min(y[n],y[n−1]). This magnitude signal is converted to logarithmic representation through an approximated log2(x) calculation. The approximated log2 is a piecewise linear approximation of a log2 function where the log value is linear approximated between all integer log2 values.

The PLD 118 approximates the Euclidian distance 506 by first taking a Fourier transform 400 of the $\Sigma w[n]e^{(jn\Theta)/k}$ signal from the window filter 206 (shown in FIG. 2), where sign(x) equals 1 if x>0, 0 if x=0, and −1 if x<0. The length of the longest in-phase detected signal 502 is then added to half of the length of the shortest in-phase detected signal 503 to produce the approximation of the Euclidian distance 506. The digitized sonar return signal 120 is then compressed and output by the $\log_2$ function 414.

FIG. 6 illustrates the logarithmic function implemented as a piecewise linear $\log_2(\ )$ function. A left-shift of the magnitude signal from the digital sonar module is performed until a "1" appears in the most significant bit. The signal is then sent through a multiplexer and a register.

I claim:

1. A digital sounder module comprising:
   a sonar transducer for transmitting an acoustic sonar wave at a selected frequency and pulse rate and for receiving echos of said transmitted acoustic sonar wave reflected from objects and for converting said received acoustic sonar wave into a first electrical signal;
   a band-pass filter for providing a first wide bandpass filtration on said first signal to produce a second signal;
   an amplifier for controlled amplification of said second signal to produce a third signal, said third signal being an amplified carrier wave;
   an analog to digital converter for receiving said amplified carrier wave, a rate at which said amplified carrier wave is converted to a digital signal by said analog to digital converter provides a harmonic sub-sampling, and said analog to digital converter transforms said amplified carrier wave into a digital intermediate frequency;
   a programmable logic device, said programmable logic device implements a non-coherent windowed in-phase/quadrature (I/Q) detector and performs a Fourier transform of the intermediate frequency sonar return signal, said Fourier transform converts the intermediate frequency sonar return signal into a complex return signal which includes a real value that is an in-phase detected signal and an imaginary value that is a quadrature detected signal, said programmable logic device then multiplies the complex return signal by a programable Kaiser window filter, said programmable Kaiser window filter sets said bandwidth and said frequency, said programmable logic device provides
   (i) a variable gain control signal to said amplifier for normalization of the amplitude of reflected echos within said second signal by increasing gain in proportion to the distance of said echo reflection source from said sonar transducer,
   (ii) a $\cos\phi$ signal to said analog to digital converter, said programmable logic device sets said harmonic sub-sampling rate of said analog to digital converter such that said reflected transmitted acoustic sonar wave is above the Nyquist frequency, and
   (iii) a piecewise linear approximation of a log2 function, wherein the log value is linear approximated between all integer log2 values;
   a programmable Kaiser window filter to transmit a windowed return signal to a power measurement function, said power measurement function transmits a power signal to a signal compression function, said signal compression function transmits a signal to a microprocessor; and
   a microprocessor, said microprocessor provides an output for a display of said reflected echos.

2. The digital sounder module of claim 1 wherein said analog to digital converter is a 12 bit analog to digital converter.

3. The digital sounder module of claim 1 wherein said harmonic sub-sampling is performed by under-sampling said sonar carrier waves containing frequencies above the Nyquist sampling rate and directly sampling said sonar carrier waves containing frequencies below the Nyquist rate.

4. The digital sounder module of claim 1 wherein said programmable logic device performs an algorithm for approximating a phase shift, where said approximation is performed by approximating either said in-phase or said quadrature component of the intermediate frequency sonar return signal as a 90 degree phase shift of the other, and said approximation divides the complexity of the calculations by half.

5. The digital sounder module of claim 4 wherein said programmable logic device approximates said phase shift by taking a Fourier transform of the $\Sigma w[n]e^{(jn\theta)/k}$ signal from said Kaiser window filter, where sign(x) equals 1 if x>0, 0 if x=0, and −1 if x<0.

6. The digital sounder module of claim 4 wherein said programmable logic device approximates a Euclidian distance by taking a Fourier transform of the $\Sigma w[n]e^{(jn\theta)/k}$ signal from said Kaiser window filter, where sign(x) equals 1 if x>0, 0 if x=0, and −1 if x<, and then adding the length of the longest in-phase detected signal to half of the length of the shortest in-phase detected signal to produce said approximation of said second Euclidian distance.

* * * * *